W. S. BAIRD.
CORN HARVESTING MACHINE.
APPLICATION FILED OCT. 14, 1911.
1,077,963.
Patented Nov. 4, 1913.
3 SHEETS—SHEET 1.
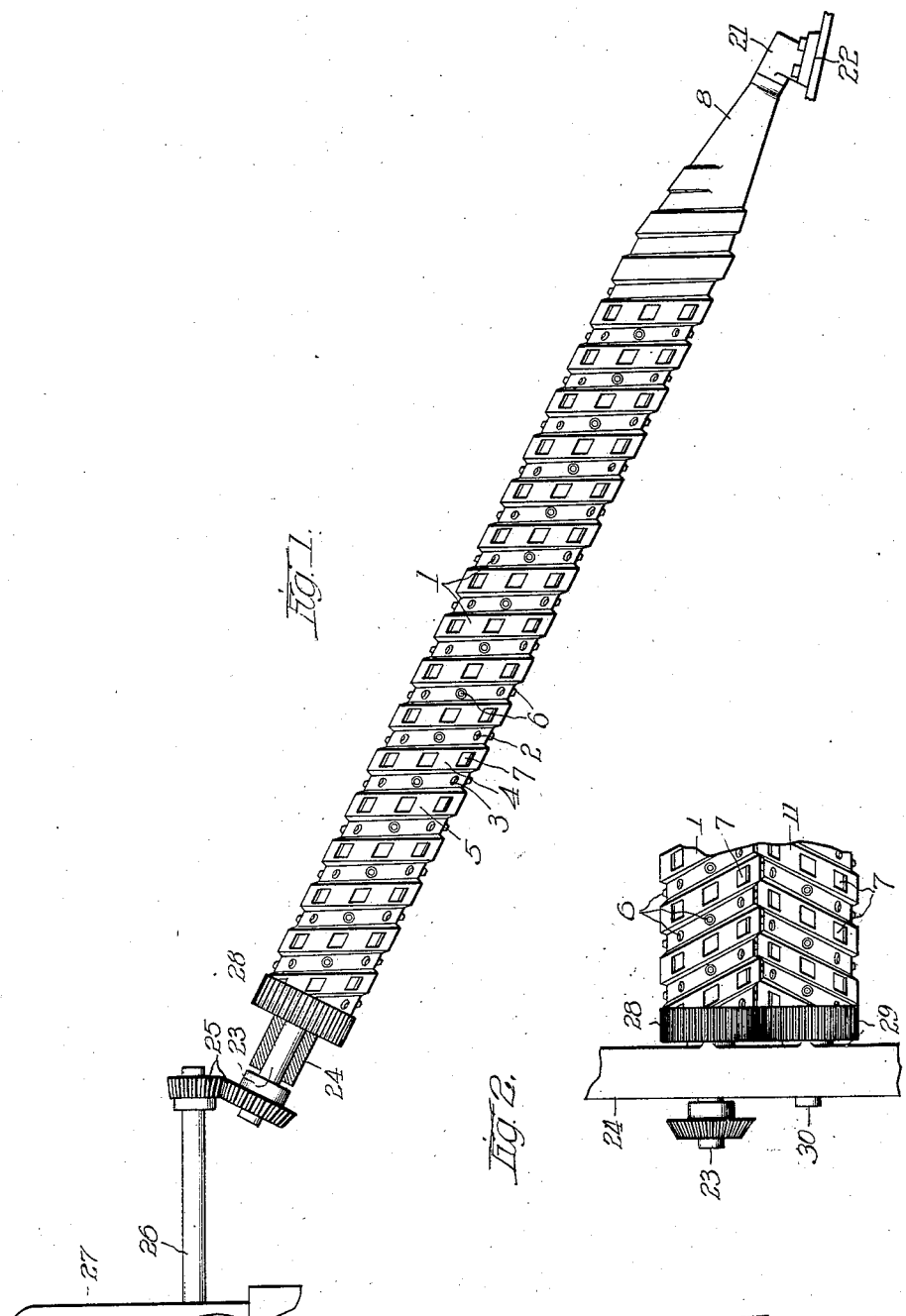
Witnesses:
Robert H. Weir
Charles J. Cobb
Inventor
William Seward Baird
By Hill & Hill Attys.

W. S. BAIRD.
CORN HARVESTING MACHINE.
APPLICATION FILED OCT. 14, 1911.
1,077,963.
Patented Nov. 4, 1913.
3 SHEETS—SHEET 2.
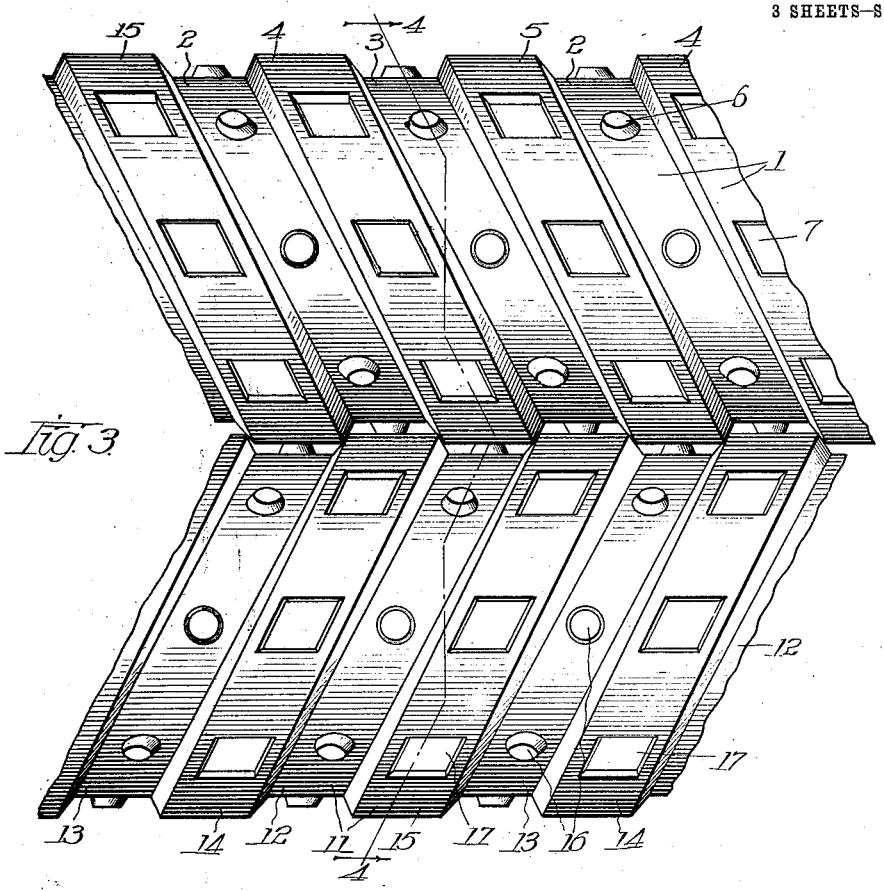
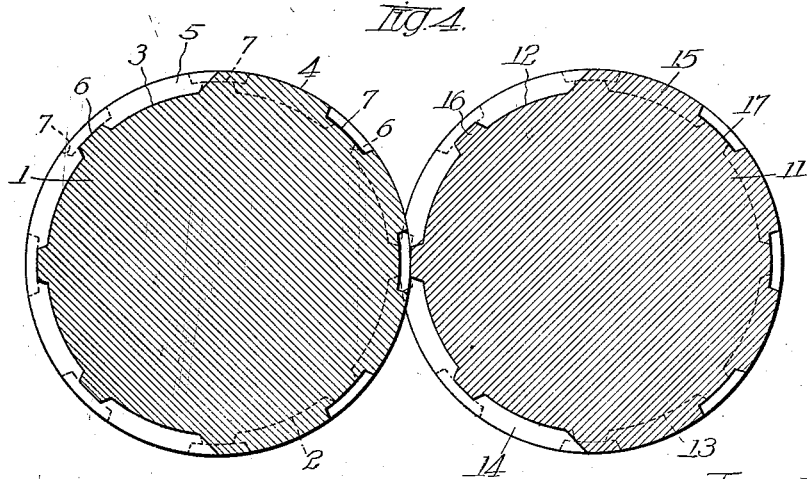

W. S. BAIRD.
CORN HARVESTING MACHINE.
APPLICATION FILED OCT. 14, 1911.
1,077,963.
Patented Nov. 4, 1913.
3 SHEETS—SHEET 3.
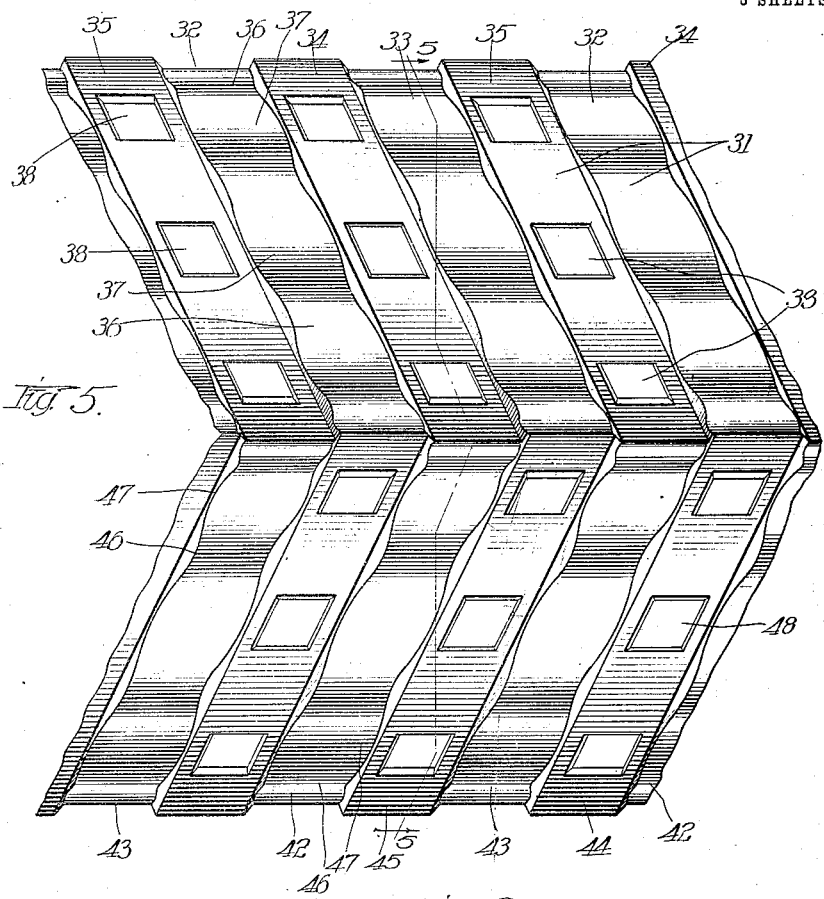
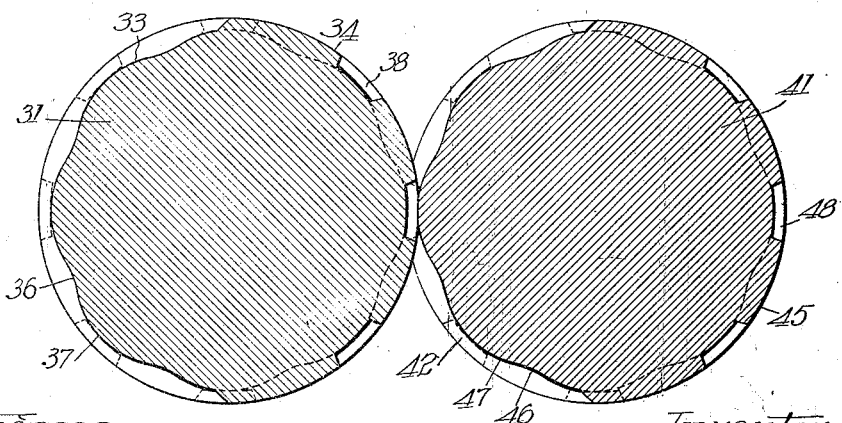

UNITED STATES PATENT OFFICE.

WILLIAM SEWARD BAIRD, OF URBANA, ILLINOIS, ASSIGNOR TO BAIRD CORN HUSKER CO., OF CHAMPAIGN, ILLINOIS, A CORPORATION OF SOUTH DAKOTA.

CORN-HARVESTING MACHINE.

1,077,963.  Specification of Letters Patent.  Patented Nov. 4, 1913.

Application filed October 14, 1911. Serial No. 654,593.

*To all whom it may concern:*

Be it known that I, WILLIAM SEWARD BAIRD, a citizen of the United States, residing at Urbana, in the county of Champaign and State of Illinois, have invented certain new and useful Improvements in Corn-Harvesting Machines, of which the following is a description.

My invention belongs to that general class of devices known as corn harvesting machines, and relates particularly to improved snapping rolls therefor for feeding the stalks and standing corn into the machine, and removing the ears of corn from the stalks.

The present invention is in the nature of an improvement over the snapping rolls shown and described in my pending application, Serial No. 589,298, filed October 27, 1910, and has among its objects the production of a more simple, efficient, durable, positive and satisfactory device of the kind described, that may be manufactured at substantially a low cost and used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a side elevation of one of the rolls. Fig. 2 is a plan view of a portion of the rolls. Fig. 3 is an enlarged top plan view of a portion of two rolls. Fig. 4 is a cross sectional view of the same, taken substantially on line 4, 4 of Fig. 3. Fig. 5 is a plan view of a portion of two rolls, showing a slightly modified construction, and Fig. 6 is a cross sectional view of the same, taken substantially on line 6, 6 of Fig. 5.

Referring to the drawings, in which two forms of my device are shown, the snapping mechanism comprises two rolls arranged parallel, or side by side, and suitably rotatably supported on the machine. The rolls may be driven in any desired manner, and are preferably rotated in opposite directions. The rolls are each spirally grooved, a plurality of grooves being preferred, double grooves or threads being shown, which are provided with stalk engaging means.

Referring particularly to Figs. 3 and 4, two rolls 1 and 11 are shown. The roll 1 is provided with spiral grooves 2 and 3, forming ridges 4 and 5, the grooves being of any desired depth and width, but spaced so that the ridges are substantially equal in width to the grooves so that the ridges of one roll may be positioned in the grooves of the other roll. On the rolls, as shown in the grooves 2 and 3, are provided a plurality of projecting lugs or pins 6, which may be formed integral with the roll or separable therefrom. A very satisfactory and the most economical construction is to cast the rolls with the lugs 6 formed integrally with the body of the roll. It will be noted that the lugs are preferably slightly tapering, and while shown as rounded, may be of any other shape. In the ridges 4 and 5 are formed pockets or recesses 7, the same being arranged so as to mate with lugs on the coöperating roll as the rolls are rotated. These depressions or recesses may be made of any desired shape, a very efficient construction being to make them angular, as shown, with the edges somewhat sharp, but, however, not sharp enough to cut the stalks. It will be noted by referring particularly to Fig. 1 that the lower end 8 of the roll is tapered and the grooves and ridges omitted at the extreme end of the roll. The lugs and recesses are also omitted from the grooves and ridges at the lower end of the rolls. The coöperating roll 11 is similarly formed with grooves 12 and 13 and ridges 14 and 15, together with the lugs 16 and recesses 17. The lugs and recesses are so arranged that they mate with the same on the coöperating roll described, as previously mentioned. The pitch of the grooves depends upon the diameter of the rolls and inclination of the same.

The rolls may be supported in any desired way, depending upon the particular construction of the machine upon which they are to be employed. As shown in Fig. 1, in which roll 1 is illustrated, the lower end of each roll is supported in a socket 21 carried on the frame 22 of the machine, the rolls being provided with supporting shafts 23 and 30, as illustrated in Figs. 1 and 2, 24 being a portion of the machine frame. To rotate the rolls one shaft 23 is extended and connected to a power shaft 26, which may be driven by an internal combustion engine 27, or other source of power. It is, of course, understood that the shaft 23 and shaft 26 may be connected in any suitable manner, as for example by a bevel gear 25, a universal coupling, or the equivalent. The shaft 23 is provided with a gear 28, arranged to mesh with a gear 29 on the shaft 30, so that driving one shaft rotates both rolls in opposite directions.

A slightly different construction of rolls is shown in Figs. 4 and 5, in which the pins or lugs 16 are omitted and the grooves corrugated or formed substantially as at 36, 37. Referring to this construction, the roll 31 is provided with grooves 32 and 33 and ridges 34, 35. The grooves 32 and 33 are corrugated so as to form low spots 36 and high places 37, which high places correspond with the lugs previously described. The opposite roll 41 is similarly provided with grooves 42, 43, and ridges 44 and 45, the grooves being corrugated as at 46 and 47. Both rolls are provided on the ridges with recesses or depressions 38 and 48 respectively, the operation of this form of rolls being substantially similar to the other form previously described.

The special value of this construction is the plurality of grooves and ridges having the lugs and recesses, or the corrugations and recesses. In operation the stalks enter between the rolls at the lower tapering ends, and are caught by the rolls and carried rearwardly. The ridges and grooves on the lowering tapering ends being smooth or straight, the stalks are forced rearwardly until they are well in the rolls before being pulled down. The rolls being constructed with a plurality of spiral grooves, the ridges may be close enough together so that the speed of the rolls will divide the stalks in the hill and feed them in one at a time, the stalks being prevented from bunching and choking the machine. As soon as the stalks reach the lugs and recesses, the co-acting rolls crimp the stalks and pull them down, as well as rearward, removing the ears from the stalks with a minimum of shelling. The action of the co-acting rolls is positive in crimping the stalks, bearing them down and forcing them rearward one at a time, all possibility of choking the machine by pulling the stalks up by their roots and feeding them in bunches being avoided, as previously mentioned. I have not considered it necessary to illustrate the trash rolls, as shown in my pending application mentioned. The trash rolls may be employed if desired, and may be constructed substantially similar to the snapping rolls herein described, the proportions of the same being as preferred.

Having thus described my invention, it is obvious that various immaterial modifications may be made in the same without departing from the spirit of my invention, hence I do not wish to be understood as limiting myself to the exact form, construction or combination of parts herein shown and described, or uses mentioned.

What I claim as new and desire to secure by Letters Patent is:—

1. In a device of the kind described, the combination of a pair of parallel spirally grooved rolls, each roll provided with projecting lugs in the grooves and spaced from the side walls thereof, and with recesses in the ridges, the lugs in each roll positioned to mate with the recesses in the other roll, and means for rotating said rolls in opposite directions.

2. In a device of the kind described, the combination of a pair of parallel spirally grooved rolls, each roll provided with projecting lugs in the grooves and with recesses in the ridges, said recesses being formed intermediate the side edges of the ridges, the lugs in each roll positioned to mate with the recesses in the other roll and means for rotating said rolls in opposite directions.

3. In a device of the kind described, the combination of a pair of parallel spirally grooved rolls, each roll provided with projecting lugs in the grooves, and with rectangular shaped recesses in the ridges, the lugs in each roll positioned to mate with the recesses in the other roll, and means for rotating said rolls in opposite directions.

4. In a device of the kind described, the combination of a pair of parallel spirally grooved rolls, each roll provided with tapering projecting lugs in the grooves and spaced from the side walls thereof, and with rectangular shaped recesses in the ridges, said recesses being intermediate the side edges thereof, the lugs in each roll positioned to mate with the recesses in the other roll and means for rotating said rolls in opposite directions.

5. In a device of the kind described, the combination of a pair of rotatable rolls, each roll provided with two spirally extending grooves, the grooves of one roll extending in the opposite directions to the grooves of the other roll, means for supporting said rolls with the ridges of one roll in the grooves of the opposite roll each roll provided with projecting lugs in the grooves and spaced from the side walls thereof, and with recesses in the ridges, the lugs in each roll positioned to mate with the recesses in the other roll, and means for rotating said rolls in opposite directions.

6. In a device of the kind described, the combination of a pair of rotatable rolls, each roll provided with two spirally extending grooves, the grooves of one roll extending in the opposite direction to the grooves of the other roll, means for supporting said rolls with the ridges of one roll in the grooves of the opposite roll, each roll provided with tapering projecting lugs located in the grooves and spaced from the side walls thereof, and with rectangular shaped recesses in the ridges intermediate the side edges thereof, the lugs of each roll positioned to mate with the recesses in the other roll, and means for rotating said rolls in opposite directions.

In testimony whereof, I have hereunto signed my name in the presence of two subscribing witnesses.

WILLIAM SEWARD BAIRD.

Witnesses:
  E. L. EVANS,
  EARL SAFSTROM.